(12) United States Patent
Takeshita

(10) Patent No.: US 6,304,650 B1
(45) Date of Patent: Oct. 16, 2001

(54) CALL PROCESSING SIGNAL ROUTING SYSTEM IN A LOCAL EXCHANGE SYSTEM

(75) Inventor: Hironori Takeshita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/111,791

(22) Filed: Jul. 8, 1998

(30) Foreign Application Priority Data

Jul. 8, 1997 (JP) .................................................. 9-182230

(51) Int. Cl.[7] .................................................. H04M 7/00
(52) U.S. Cl. ........................................ 379/219; 379/220.01
(58) Field of Search ............................... 379/219, 220.01, 379/221.08, 221.12, 201.01

(56) References Cited

U.S. PATENT DOCUMENTS 5,583,920 * 12/1996 Wheeler, Jr. .

FOREIGN PATENT DOCUMENTS

| | | |
|---|---|---|
| 2-291753 | 12/1990 | (JP) . |
| 4-100440 | 4/1992 | (JP) . |
| 4-291875 | 10/1992 | (JP) . |
| 5-95427 | 4/1993 | (JP) . |
| 6-284184 | 10/1994 | (JP) . |
| 6-338956 | 12/1994 | (JP) . |

* cited by examiner

Primary Examiner—Creighton Smith
(74) Attorney, Agent, or Firm—Foley & Lardner

(57) ABSTRACT

A local exchange system comprises a common signal handler for each of a plurality of trunks for receiving data from respective nodes disposed outside the exchange system. The common signal handlers and central processor in the local exchange system are connected together by a local area network (LAN). A received signal is converted to LAN data including destination address of the received data. The central processor receives and processes the received data if the destination address is directed to the own station, whereas one of the common signal handlers passes the received data after conversion of the LAN data to the original data if the destination address is directed to a corresponding node.

3 Claims, 3 Drawing Sheets

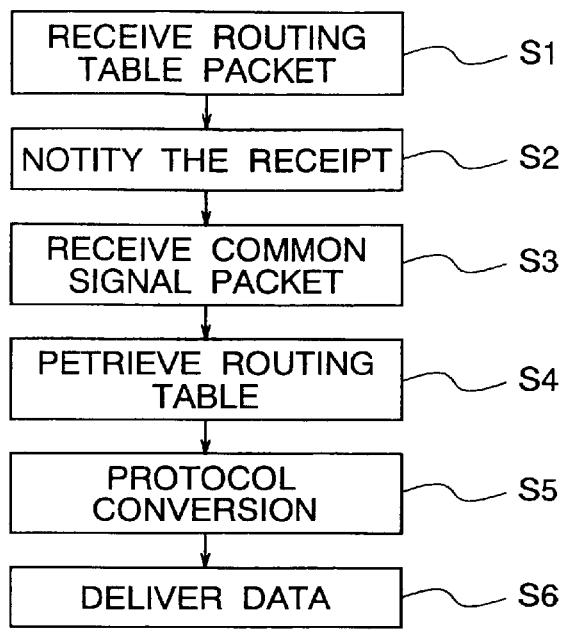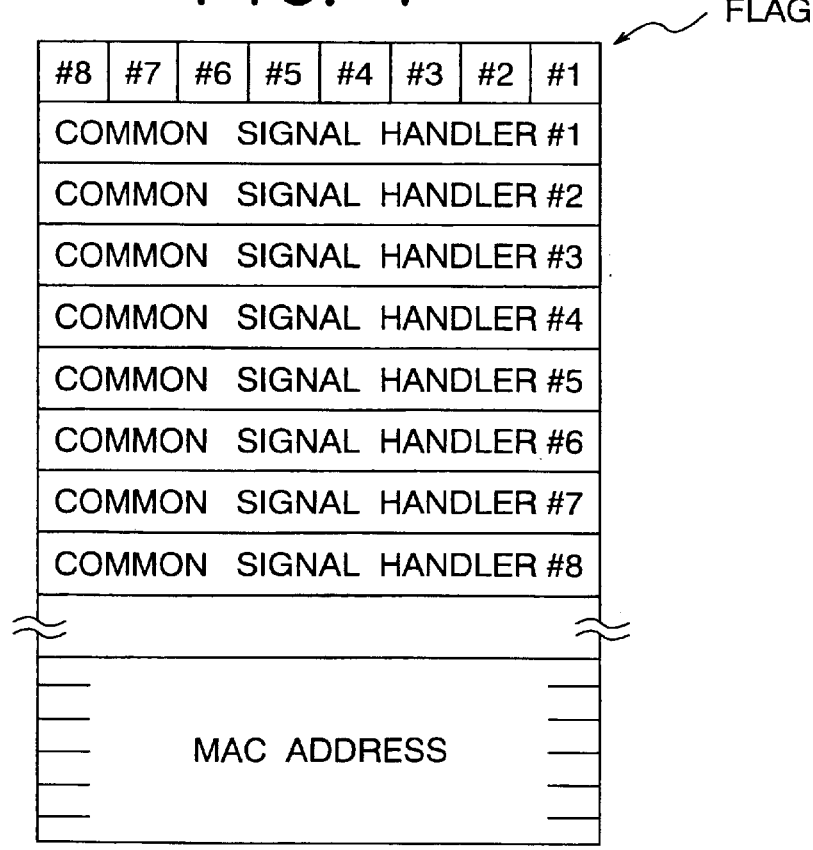

CALL PROCESSING SIGNAL ROUTING SYSTEM IN A LOCAL EXCHANGE SYSTEM

BACKGROUND OF THE INVENTION (a) Field of the Invention

The present invention relates to a call processing signal routing system in a local exchange system, and more particularly, to a call processing signal routing system for transferring a call processing signal in a signaling system, such as ISDN or No. 7 common signaling system.

(b) Description of the Related Art

Conventional signaling systems, such as ISDN or No. 7 common signaling system, generally comprises a central processor in a local exchange system of a routing station for receiving a call processing message. FIG. 1 is a schematic block diagram for showing the configuration of a local exchange system of a routing station and the signal flow of the call processing signal therein.

The local exchange system comprises a time-division switch 11, a central processor 12, trunks 13 and 15, and common signal equipment (CSE) 14 and 16. Trunks 13 and 15 are connected to respective nodes corresponding to other local exchange systems through transmission lines 20 and 21. The common signal equipment 14 or 16 controls data in the data link layer, and the central processor 12 controls data in the network layer. When a call processing message arrives through transmission line 20, for example, common signal equipment 14 extracts the call processing message from trunk 13 to transfer the same to central processor 12.

Central processor 12 operates by itself for routing the received signal if the message is addressed to the own local exchange system. On the other hand, if the message is addressed to another node or another local exchange system, the message is transferred through common signal equipment 16 to corresponding trunk 15, and then to the specified node outside the station. In this system, all the routing processing in the exchange system is performed by the central processor 12, which causes a heavy load to the central processor 12.

Some proposals are made to alleviate the load of the central processor, wherein the common signal equipment has a function for processing signal routing by itself to alleviate the load of the central processor. In this system, each common signal equipment stores routing information (address) for the own station, and judges whether or not the routing information in the received signal coincides with the stored routing information.

If it is judged that the received routing information coincides with the stored routing information in the common signal equipment, then the received data is transferred to the central processor for processing the received data in the own station. If not, the received routing information is transferred to the central processor for further routing processing to thereby select the transmission line for the message. By using the proposed system, the data transfer between common signal equipment and the central processor is reduced to some extent to thereby alleviate the load of the central processor.

In the proposed system, however, if the received routing information does not coincide with the stored routing information, the central processor further operates for routing processing, resulting in limited load alleviation of the central processor, with limited reduction of the routing processing time.

SUMMARY OF THE INVENTION

It is therefore an object of the present invention to provide a call processing signal routing system in a local exchange system of a routing station, which is capable of alleviating the load of central processor in the local exchange system and reducing the routing processing time.

The present invention provides a local exchange system comprising a plurality of trunks connected to respective nodes outside the exchange system for receiving a signal in an original data format including a destination address, a plurality of common signal handlers, disposed for respective the trunks, for converting a received signal received through a corresponding one of the trunks into local area network data, a central processor for controlling operations of the local exchange system, and a local area network for coupling the common signal handlers and the central processor together for transmitting the local area network data therebetween, the central processor receiving and processing the local area network data if the destination address is directed to the local exchange system, each of the common signal handlers converting the local area network data into the original data format for transmission through a corresponding one of the trunks if the destination address is directed to a corresponding one of the nodes.

In accordance with the local exchange system of the present invention, the routing processing in the local exchange system can be conducted by using the local area network so that the load of the central processor is alleviated and the routing processing can be performed with reduced time.

The above and other objects, features and advantages of the present invention will be more apparent from the following description, referring to the accompanying drawings.

BRIEF DESCRIPTION OF DRAWINGS

FIG. 3 is a flowchart of processing by the common signal handler shown in FIG. 2;

FIG. 4 is a routing table supplied from the central processor shown in FIG. 2;

PREFERRED EMBODIMENTS OF THE INVENTION

Figure 1:
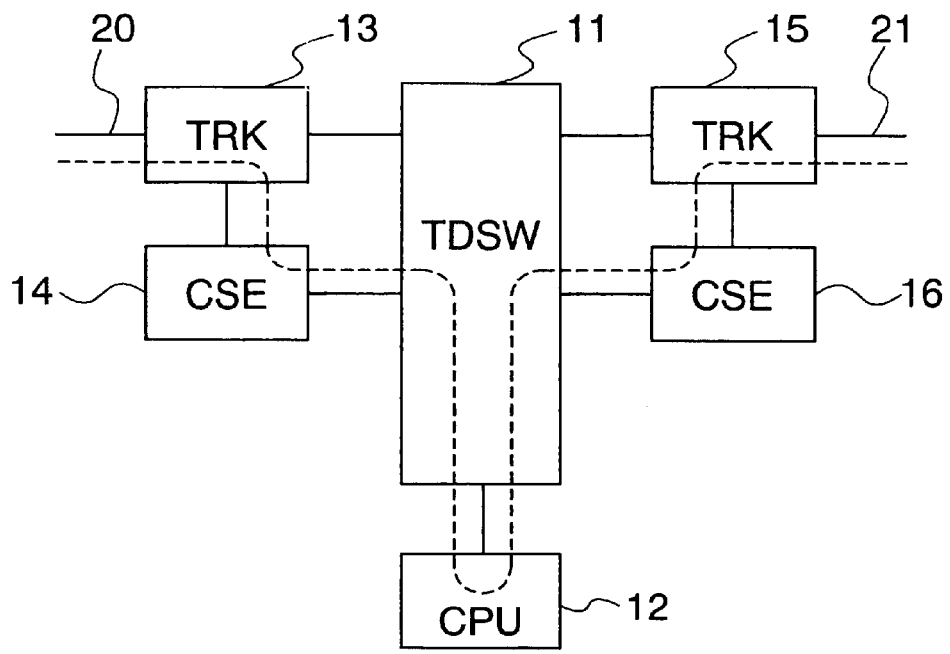
FIG. 1 is a block diagram of a conventional local exchange system operating for call processing signal routing.

Now, the present invention is more specifically described with reference to accompanying drawings, wherein similar constituent elements are designated by similar reference numerals.

Figure 2:
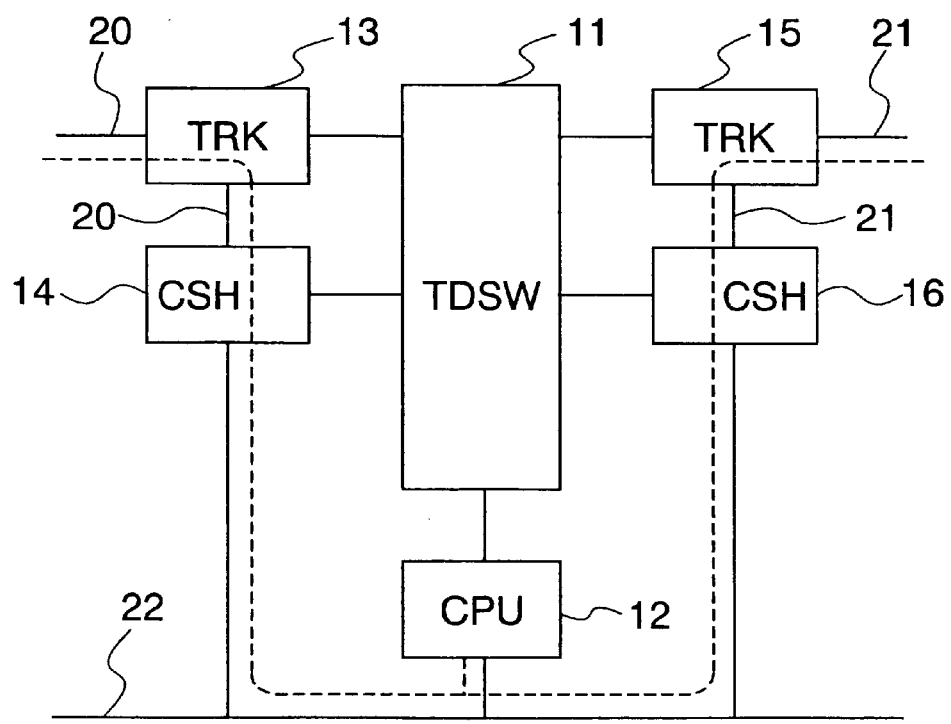
FIG. 2 is a block diagram of a local exchange system for call processing signal routing according to an embodiment of the present invention.

Referring to FIG. 2, a local exchange system for operating call processing signal routing in a routing station according to an embodiment of the present invention comprises a time-division switch (TDSW) 11, a central processor (CPU) 12, a plurality of trunks such as trunks 13 and 15, a plurality of common signal handlers (CSH, simply referred to as signal handlers, hereinafter), such as signal handlers 14 and 16, disposed corresponding to the trunks 13 and 15, and a local area network (LAN) 22 for coupling the signal handlers 14 and 16 and central processor 12 together. The trunks 13 and 15 are connected to respective nodes or other local exchange systems via transmission lines 20 and 21. Each constituent element in the local exchange system has an interface with LAN 22.

Signal handlers 14 and 16 are connected to trunks 13 and 15, respectively, and further connected to respective nodes through transmission lines 20 and 21. Signal handlers 14 and 16 are connected to central processor 12 via LAN 22 and have a function of a bridge to perform routing in the data link layer. The LAN 22 is implemented by Ethernet in this embodiment. When central processor 12 transmits a call-processing message to a specified node, the address of the node in the wide area network (or public communications system) is attached to the message.

Each of the signal handlers 14 and 16 has a function for judging whether the message is directed to the corresponding node based on the address of the message supplied through LAN 22. When a message is received through transmission line 20, for example, signal handler 14 relays the call-processing message extracted from trunk 13 onto LAN 22. If the message is addressed to the own station, central processor 12 receives therein the message for further processing. If the message is directed to a node outside the local exchange system connected through transmission line 21, corresponding signal handler 16 relays the message to the node via trunk 15.

Referring to FIG. 3, there is shown a flowchart of processing by signal handler 14 receiving the message. Each signal handler receives a routing table information packet from the central processor 12 during an initializing operation of the local exchange system at step S1, and delivers a notification of receipt of the routing table information to the central processor 12 at step S2.

FIG. 4 shows an example of the routing table information, wherein a plurality of signal handlers, for example, #1 to #8 signal handlers have respective addresses registered in the central processor 12. The signal handlers then in operation with the data links are notified by "1" of respective flags. The routing information includes sequential numbers of the signal handlers and corresponding addresses of nodes. If a signal handler is not in operation or registered, the corresponding flag shows the invalid state of the signal handler, and corresponding media access control (MAC) address is set "0".

Figure 5:
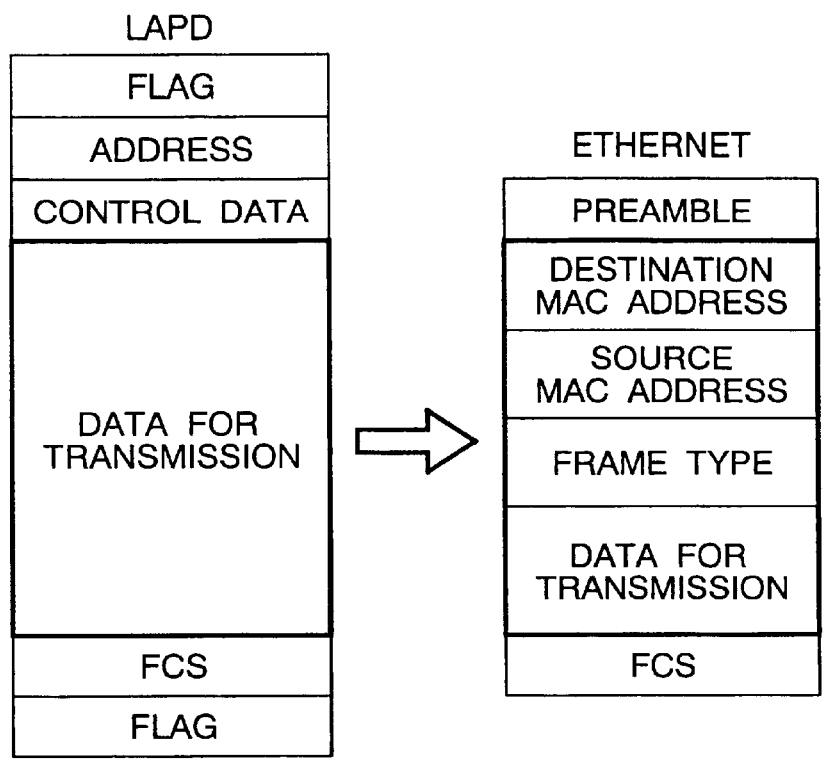
FIG. 5 is a schematic diagram for tabulating LAPD protocol and Ethernet protocol for protocol conversion in the common signal handler.

When a packet including a call processing message of LAPD protocol is received from a node through transmission line 20 at step S3, signal handler 14 judges based on the IP address in the message whether the message is directed to the own station or a counter station at step S4. If it is judged that the message is directed to the own station, signal handler 14 converts the LAPD protocol to an Ethernet protocol at step S5 based on the table such as shown in FIG. 5. The Ethernet protocol data converted from one IP packet frame includes information of preamble, destination MAC address, source MAC address, frame type, data for transmission, and frame check sequence (FCS). The MAC addresses are obtained by retrieving a routing table based on the IP address, and delivered to the Ethernet at step S6. The central processor 12 confirms that the call-processing message data is addressed to the own station based on the MAC address, thereby receiving and processing the call-processing message therein.

If the IP address in the received message is not directed to the own station but to a node outside the own station, signal handler 14 retrieve the sequential number of signal handler corresponding to the specified node based on the routing table at step S4. Signal handler 14 then specifies the MAC address of the retrieved signal handler, signal handler 16, for example, and converts the LAPD protocol of the received data to Ethernet protocol at step S5.

Figure 6:
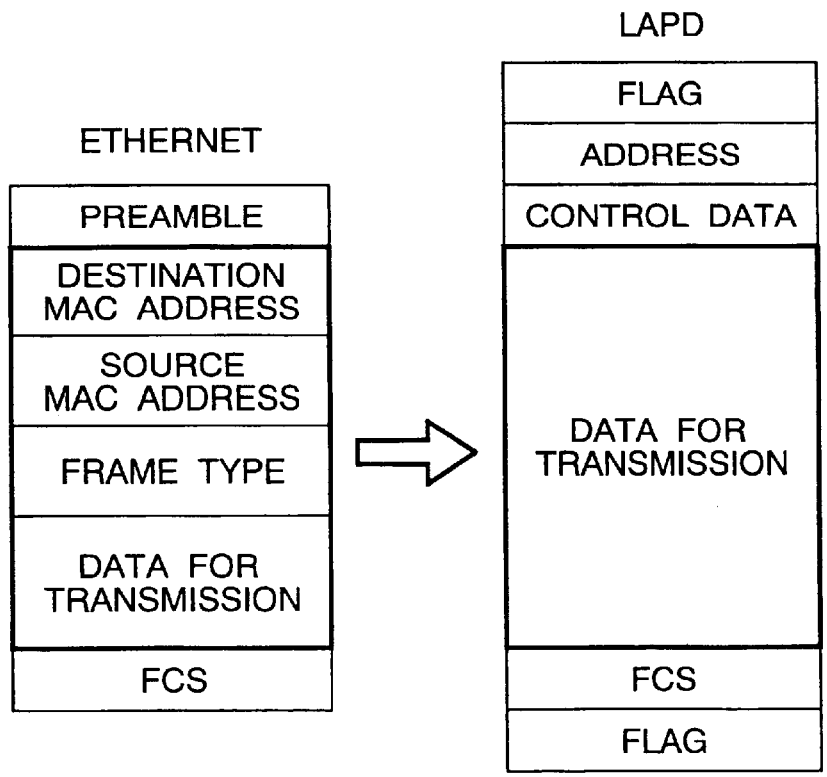
FIG. 6 is a schematic diagram for tabulating Ethernet and LAPD for reverse protocol conversion in the common signal handler.

The data obtained by the protocol conversion is delivered onto Ethernet 22. Signal handler 16 corresponding to the specified node confirms that the delivered data is addressed to the corresponding node based on the MAC address to receive the data from Ethernet 22. Signal handler 16 then converts the Ethernet protocol to LAPD protocol based on a table such as shown in FIG. 6 to generate the original data. The converted LAPD protocol data for one packet frame includes a flag, destination and source addresses, control data, data for transmission, and FCS.

In the above embodiment, the LAN is not limited to Ethernet and may be any local area network.

Since the above embodiments are described only for examples, the present invention is not limited to the above embodiments and various modifications or alterations can be easily made therefrom by those skilled in the art without departing from the scope of the present invention.

What is claimed is:

1. A local exchange system comprising a plurality of trunks connected to respective nodes outside the local exchange system for receiving a signal in original data format including a destination address, a plurality of common signal handlers, disposed for respective said trunks, for converting a received signal through a corresponding one of said trunks into a local area network data, and for judging whether the received signal is directed to the local exchange system based on the destination address of said received signal using a stored routing table, a central processor for controlling operations of the local exchange system, and a local area network for coupling said common signal handlers and said central processor together for transmitting said local area network data therebetween, said central processor receiving and processing said local area network data if said destination address is directed to the local exchange system, each of said common signal handlers converting said local area network data into said original data format for transmission through a corresponding one of said trunks if said destination address is directed to a corresponding one of said nodes that is outside the local exchange system.

2. A local exchange system as defined in claim 1, wherein said local area network is Ethernet.

3. A local exchange system wherein each of said common signal handler stores an address of said nodes in association with a corresponding common signal handler.

\* \* \* \* \*